July 28, 1953  A. WAGNER ET AL  2,646,734
PHOTOFLASH SYNCHRONIZING MECHANISM
FOR FOCAL PLANE SHUTTER CAMERAS
Filed May 29, 1951  5 Sheets-Sheet 1

ADAM WAGNER
AUGUST BRÜHL   INVENTORS
WALTER JUNG
BY

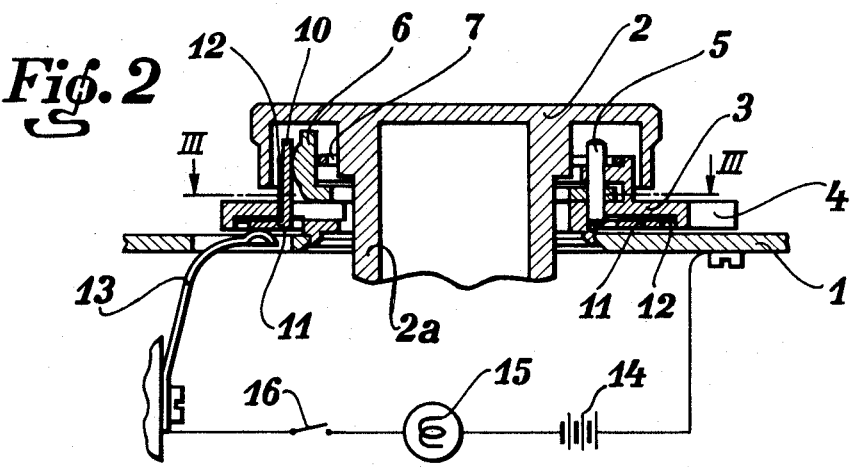
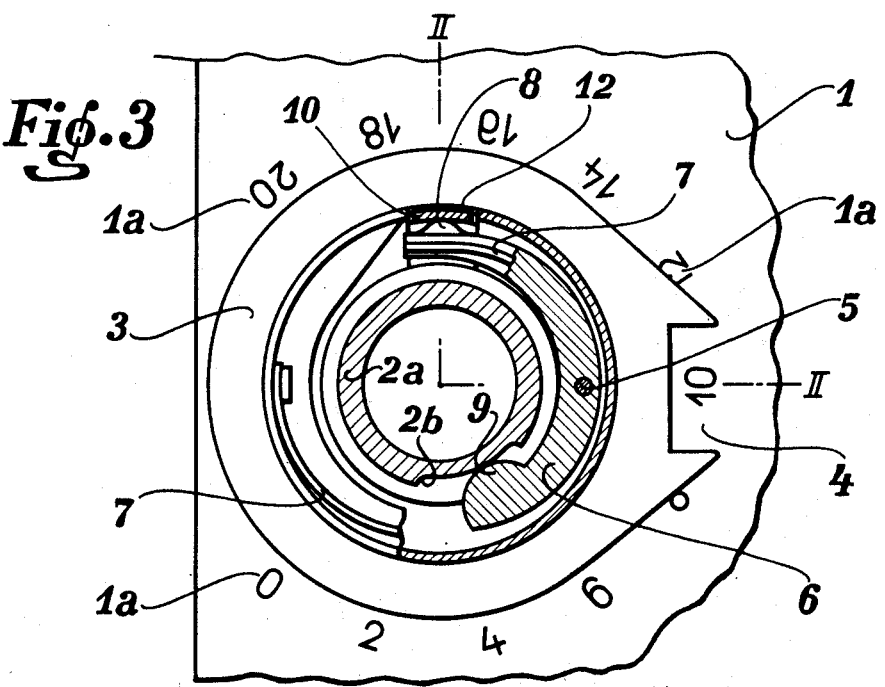

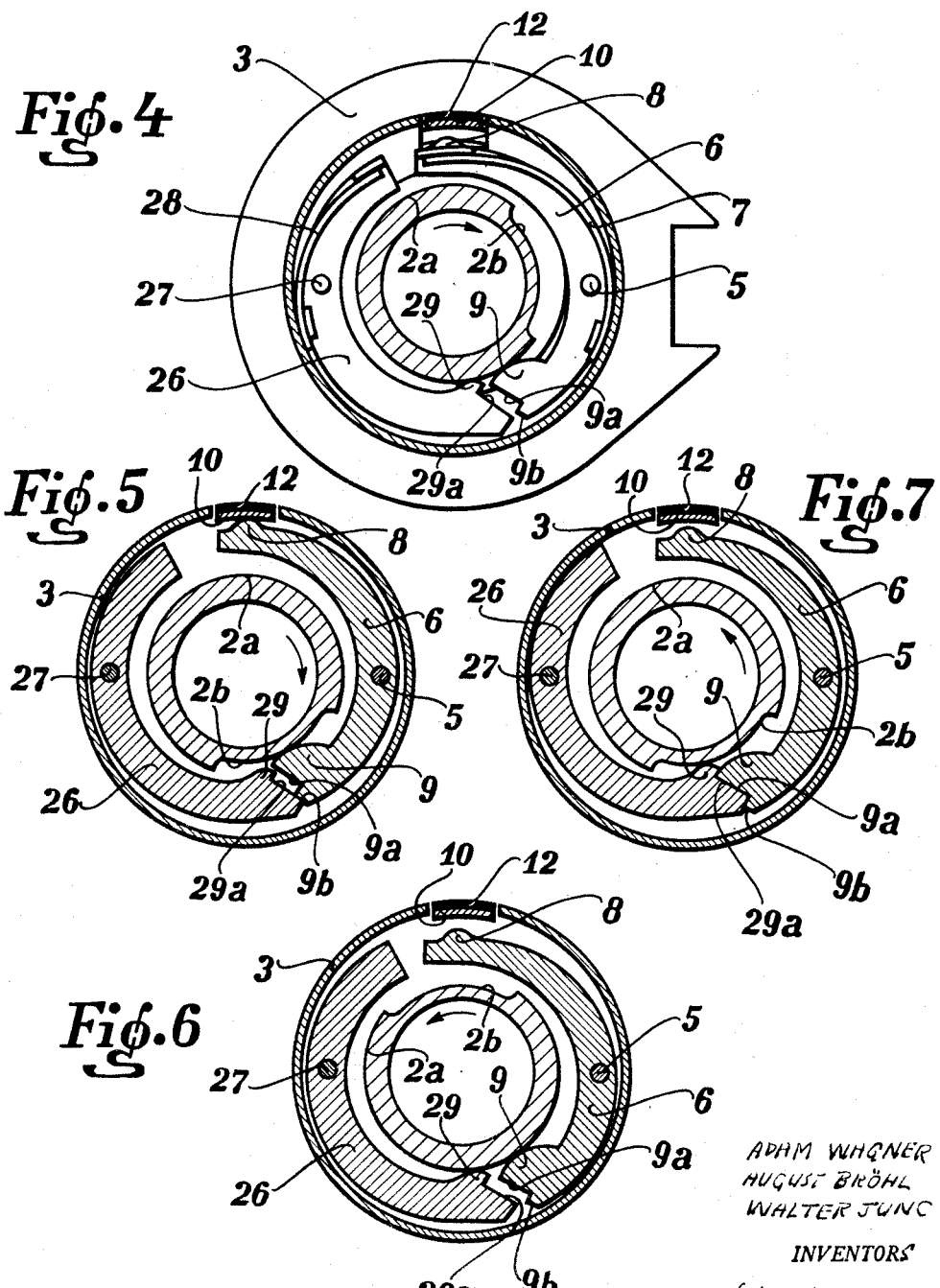

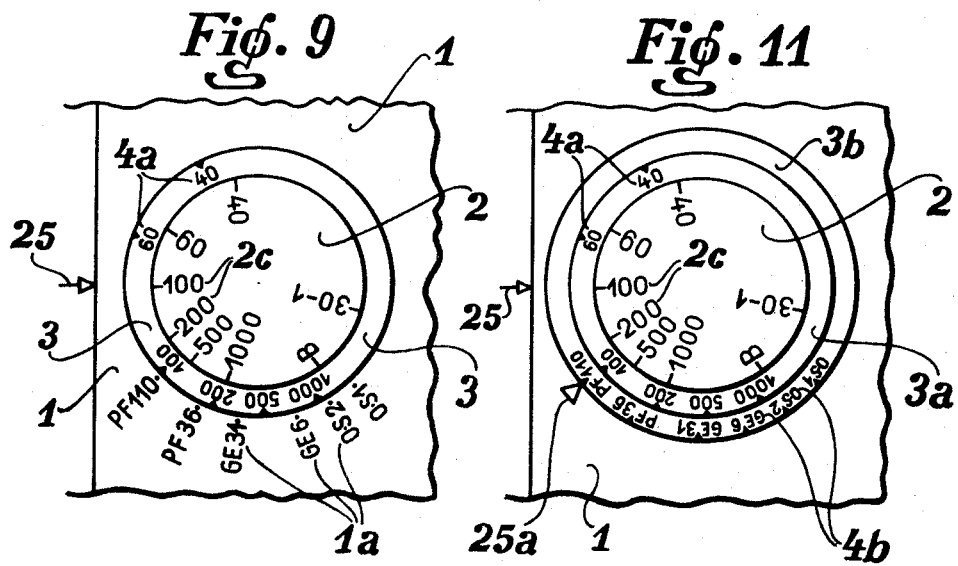
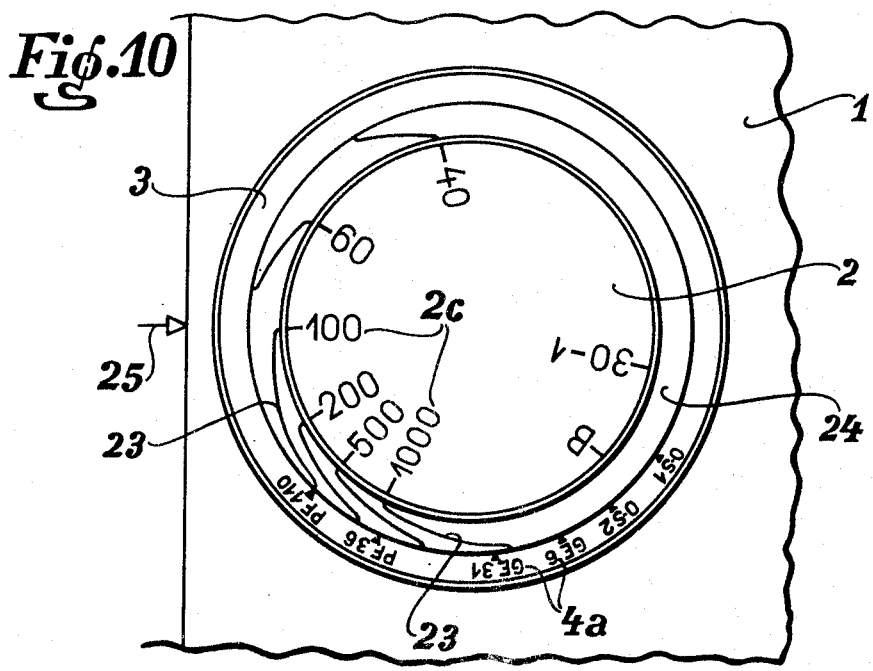

July 28, 1953  A. WAGNER ET AL  2,646,734
PHOTOFLASH SYNCHRONIZING MECHANISM
FOR FOCAL PLANE SHUTTER CAMERAS
Filed May 29, 1951  5 Sheets-Sheet 5

ADAM WAGNER
AUGUST BRÖHL    INVENTORS
WALTER JUNG
BY
Ivan E.G. Kingsbury
Atty

Patented July 28, 1953

2,646,734

UNITED STATES PATENT OFFICE 2,646,734

PHOTOFLASH SYNCHRONIZING MECHANISM FOR FOCAL PLANE SHUTTER CAMERAS

Adam Wagner, August Bröhl, and Walter Jung, Wetzlar (Lahn), Germany, assignors to Ernst Leitz, G. m. b. H., a corporation of Germany Application May 29, 1951, Serial No. 228,814
In Germany July 8, 1950

1 Claim. (Cl. 95—11.5)

This invention relates to improvements in photographic flashlight synchronizing mechanisms for use with cameras of the "Leica" type which employs a focal plane shutter or curtain shutter. The object of the invention is to provide a synchronizing mechanism which is actuated by the movement of the timing knob of the camera when the shutter is released. With such types of cameras it is difficult to bring the firing moment of the flash into the correct relation with the movements of the exposure opening or curtain slit when the shutter is released. In order to obtain perfect synchronization a mechanism must be provided which functions in correct relation to the size and movement of the exposure opening and in correct relation to the firing moment of the particular type of flashlight which is being used.

Heretofore only one of these two factors has been considered and the synchronization has been so arranged that it would be more or less satisfactory for a given limited range of operation of the second, non-adjustable, factor.

The present invention provides a synchronizing mechanism which is operable in connection with selected types of flashlights and with selected exposure openings, which latter are adjustable by the setting of the speed dial or time setting knob of the camera.

The invention is embodied in a synchronizing mechanism in which a setting ring is rotatably mounted on the camera and carries members for opening and closing the terminals in the flashlight circuit. The setting ring stands still while the shutter is released. The circuit terminals are closed by a rotating cam and lever which move with the time setting knob. The invention may include additional safety elements or the terminals may be provided with a safety blocking lever. The latter will prevent unintentional closure of the flashlight circuit when the shutter is rewound.

Another feature of the invention consists in that the said setting ring is provided with a pointer element for adjusting the ring with relation to certain indicia carried by a fixed scale member on the camera housing. Still another feature is that the setting ring itself may carry scale indicia marked with time values while another fixed concentric dial carries a scale with flash values. The dials are interchangeable so that the first named scale may indicate flash values and the second scale may indicate time values.

It is a further object of the invention and one of its features that the synchronizing mechanism is a built-in mechanism in which the synchronizing elements are located within the usual timing knob of the camera, known as the main speed dial.

Accordingly the invention is embodied in a synchronizing mechanism as hereinafter described, claimed and illustrated in the accompanying drawings in which:

Fig. 2 is a sectional view of the time setting knob and synchronizing elements taken on the rectangled line II—II of Fig. 3.

Fig. 3 is a sectional plan view of the same mechanism taken on the line III—III of Fig. 2.

Figs. 4-7 are sectional views of the synchronizing mechanism including the blocking lever mentioned above and which takes the place of any special safety switch. These figures show the different positions during their operation.

Figs. 9-12 are plan views showing different arrangements of scales and scale markings for indicating time values and flash values, such scales being adjustable so as to adjust the operating elements of the synchronizing mechanism for perfect synchronization.

Figure 1:
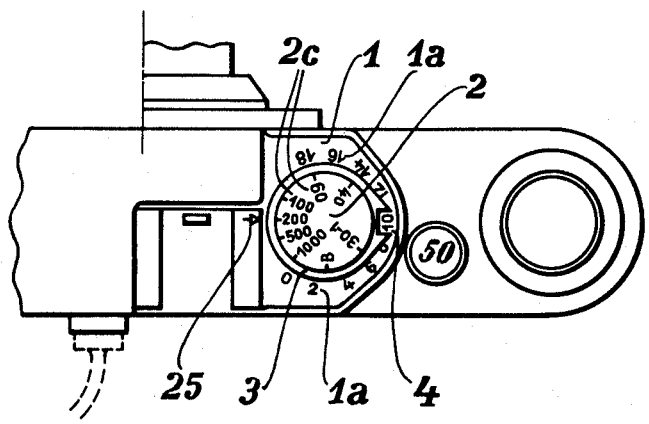
Fig. 1 is a top plan view of a focal plane shutter camera showing the time setting knob with the main speed dial and certain synchronizing elements, parts being broken away.

Referring first to Figs. 1-3, there is shown a focal plane shutter camera of the "Leica" type, the camera 1 having the usual exposure setting knob 2 which carries the figures or scale 2c indicating the width of the exposure opening ascertained from an exposure meter. The scale is set with reference to a fixed mark 25. Underneath the knob and coaxial therewith the camera housing supports a rotatable setting ring 3 having a window 4 through which the figures of a scale 1a may be read. The gradations of the scale 1a indicate flash values in relation to exposure values on the scale 2c.

The setting ring 3 carries a bolt 5 upon which is pivoted a two armed lever 6, Fig. 3. The lever lies within the hollow knob 2 and has at one end a contact 8 and at the other end a nose 9 which rides upon the outer surface of a hollow shaft 2a which extends downward from the knob 2, see Fig. 8. The shaft 2a, hereinafter called a cam, has a depression 2b. The lever contact 8 is adapted to engage another contact 10 which projects upwardly from a contact ring 11 which is secured to the setting ring 3 by an insulating sleeve 12. The contact ring rotates in gliding contact with a fixed flashlight circuit terminal 13, Fig. 8. A spring 7 tends to move the lever contact 8 into engagement with the contact 10 and also keeps the nose 9 in contact with the cylindrical surface of the cam 2a. The closing of the flashlight circuit via contact 13 depends upon the circumferential positions of the depression 2b and the nose 9, respectively.

The electric circuit for the flashlight is shown diagrammatically in Fig. 2 and includes a battery 14, a lamp 15, a circuit closing switch 16, contact 13, contact 8 and 10 within the camera, the metal parts of which function as ground connections as usual.

The operation is as follows. It is known in the art that the time setting knob 2 is connected with the first released curtain of the focal plane shutter or curtain shutter and also actuates the release of the second curtain of the shutter at a time moment depending upon the setting of the exposure value by rotating the knob 2 and the scale 2c with reference to the fixed mark 25. The shutter curtains and operating connections with the setting knob are not shown because they are well known in the art. See, for example, the disclosures in U. S. Patent 1,652,553 and Patent 2,122,671. The earlier disclosures, December 13, 1927, and July 5, 1938, respectively, as well as this invention relate to focal plane shutters consisting of two curtains which are run off, one independently of the other. They are therefore distinct from focal plane shutters of the multiple aperture type, which require a different type of synchronizing mechanism from that herein disclosed. Before the shutter is released by depressing the button 50 the knob 2 has been rotated and set to the selected exposure indicated on the scale 2c and consequently the depression 2b on cam 2a is automatically moved to a corresponding timing position with respect to the nose 9 on lever 6.

The ring 3 is rotated and set to the flash value indicated on the scale 1a and seen through the window 4. The rotation of the ring 3 causes rotary movement of the pivot 5 of lever 6 whereby the nose 9 of said lever is moved into a position which represents the value of the selected type of flash in its relation to the selected exposure.

When the shutter is released the depression 2b will after a certain lapse of time be brought within the range of the nose 9 and the latter will enter the depression 2b and the contacts 8—10 will be closed and the flashlight will be fired. Thereafter the shutter continues its movement after the exposure, the nose 9 will move out of the depression and the circuit will again open at the contacts 8—10.

Figure 8:
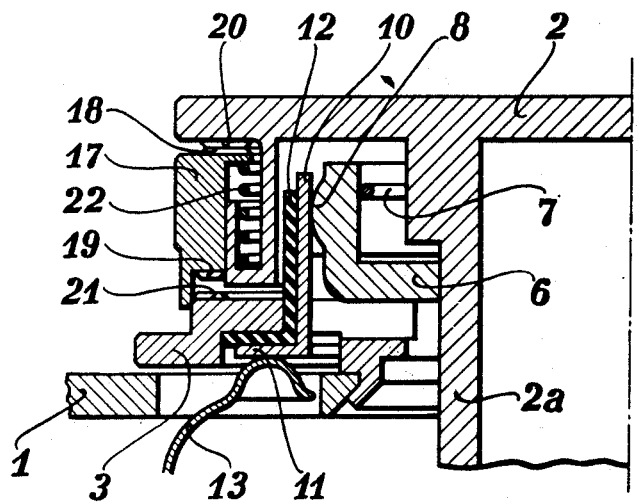
Fig. 8 is a sectional view with parts broken away showing a modified form of the setting knob and the setting ring.

Fig. 8 illustrates a modification for a more convenient manual rotation or setting of the ring 3. A hand grip sleeve 17 surrounds the knob 2 and the ring 3. The sleeve has teeth 18 and 19 which engage teeth 20 and 21 on the knob and the ring, respectively. A spring 22 maintains contact between the teeth 20 and 18, so that the sleeve will rotate with the knob 2 when the exposure values are set. By moving the sleeve axially against the force of the spring 22, the teeth 19 and 21 are brought into engagement for adjustment or rotation of the setting ring 3 in accordance with the flash value scale 1a.

The circuit closing switch 16 may be eliminated if the contacts 8—10 are provided with blocking elements so that unintentional firing of the flash is prevented. This is necessary for the reason that when the shutter is wound up, the knob 2 is rotated clockwise is a direction opposite to that in which it is rotated when the shutter is released and during the winding up movement the knob 2 would cause a second engagement of the contacts 8—10. Figs. 4–7 illustrate a modification whereby closing of the flashlight circuit when the shutter is wound up is prevented.

For this purpose there is provided within the knob 2 a blocking lever 26 which is pivoted on a bolt 27 upon the setting ring 3 in the same manner as the foresaid lever 6. A spring 28 tends to keep the nose 29 of lever 26 in contact with the cam 2a. Each of the nose ends of the levers 6 and 26 is provided with a complementary cam 9a and 29a, respectively, whereby the two levers mutually support each other when the knob 2 is running backwards for winding up the shutter and whereby the nose 9 is prevented from engaging the depression 2b.

The operation is as follows. Fig. 4 shows the positions of the two levers 6 and 26 with their noses 9 and 29, respectively, resting against the cam 2a when the shutter is wound up. The contacts 8—10 are open. When the shutter is released the cam 2a begins to rotate in the direction of the arrow and the depression 2b comes within the range of the nose 9. The latter enters the depression 2b by the force of the spring 7 and causes contact 8 to close upon contact 10 whereby the flash circuit is closed. The nose 29 on lever 26 comes within the range of the depression later than the nose 9 on lever 26 so that the nose 29 will not enter the depression because the cam 29a is stopped by the cam 9a and by a small lug 9b on the lever 6, Fig. 5.

At the end of the released shutter movement the noses 9 and 29 will again be in positions resting against the cam 2a, the contacts 8—10 will open and the complementary cams 9a and 29a are disengaged, Fig. 6. The cam 2a rotates contrary to the direction of the arrow in Fig. 6 when the shutter is rewound. Therefore, during the rewinding movement the depression 2b comes opposite the nose 29 on lever 26 and the nose enters the depression. Thereafter the depression comes opposite the nose 9 on lever 6 and the two complementary cams 29a and 9b engage each other and the lug 9b also engages the lever 26.

This prevents the nose 9 from entering the depression and the contacts 8—10 remain open, Fig. 7. When the depression 2b by rotation of the cam 2a passes beyond the ranges of the lever noses, the latter will again ride on the surface of the cam and the complementary cams are disengaged as shown in Fig. 4.

The modification illustrated and described under Fig. 8 is also applicable to the arrangements shown in Figs. 4–7.

Figs. 9–13 show different arrangements of the exposure time scales and the scales indicating flash values or moments of flash of different types of flashlights. In Fig. 9 the camera housing carries a fixed flash value scale 1a. The setting ring 3 carries a flash time scale 4a which has the same time values as the exposure scale 2c which is on the main speed dial 2, the latter being set with reference to a fixed mark 25. In order to synchronize, the time scale on the ring 3 is set with its exposure time marks opposite the flash value marks in the scale 1a, whereby the necessary adjustments of the lever 9 and the depression 2b within the knob 2 are effected.

In Fig. 10 the setting ring 3 carries the flash time scale. The marks 2c on the main speed dial knob 2 have lead lines 23 which extend into the range of the scale marks 4a on the ring 3. In order to synchronize the selected value mark, scale 4a is moved into register with the end point of the lead line 23 which leads to the time mark on the main speed dial which appears opposite the fixed mark 25.

Fig. 11 shows a modification which includes two setting rings 3a and 3b frictionally connected. The ring 3a is marked with a time scale 4a. The ring 3b is marked with a flash value scale 4b. The rings are adjustable relative to each other and may also move together with reference to the fixed mark 25a which is identical in function with the mark 25. For synchronizing the time marks 4a on the ring 3a which corresponds to the exposure timing marks 2c are adjusted with respect to the flash values 4b on the ring 3b. The selected flash value 4b is then moved to register with the mark 25a and during this movement of the ring 3b the ring 3a is also moved. Synchronization is thus effected because the setting rings 3a and 3b effect the adjustments of the synchronizing elements within the knob 2.

Figure 12:
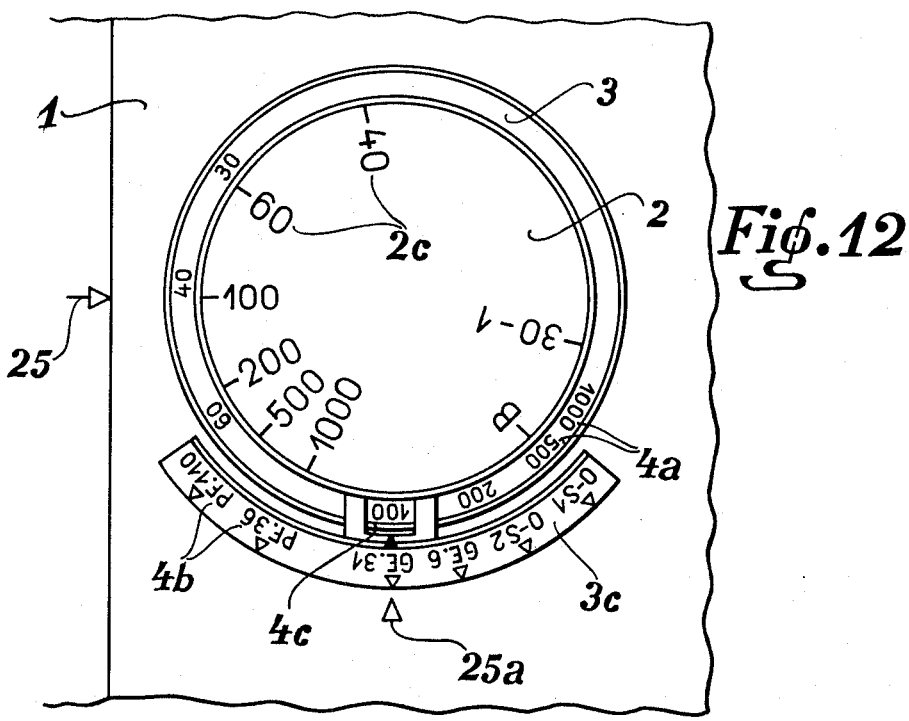
Figure 13:
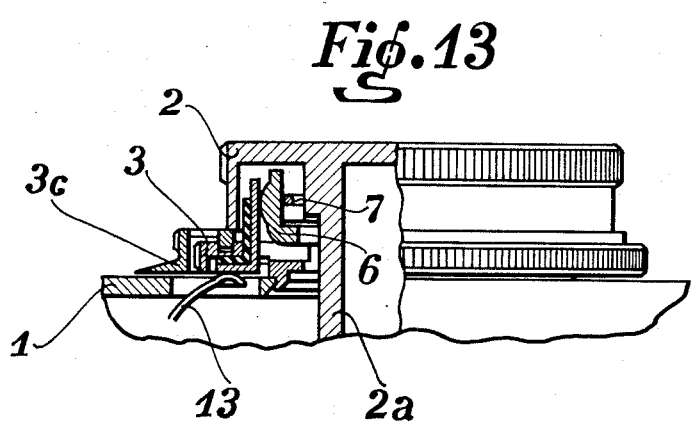
Fig. 13 is a side view, partly in section, of the mechanism shown in Fig. 12.

Figs. 12 and 13 show a still further modification in which the setting ring is provided with a scale segment 3c which is frictionally adjustable on the ring 3 and has a window 4c through which the markings of an exposure time scale 4a appears. Synchronization is obtained by setting the window 4c over an exposure time mark on the scale 4a on ring 3 which corresponds to the selected exposure time set on the scale 2c. Then both the segment and the setting ring 3 are moved whereby to register a selected flash value mark on the segment with the fixed mark 25a on the camera housing.

The arrangements of the scale members in the above examples are not critical. It is within the scope of the invention that the several scale elements may be interchangeable. These and other modifications and changes in the disclosed invention are claimed within the scope of the appended claim in which the term "flash time" is used to designate the firing moment of the flashlight as distinguished from exposure time and for the sake of simplicity of expression.

Synchronization in accordance with this invention is obtained by first setting or adjusting the "exposure time" on the main speed dial knob 2 which is rotated when the shutter is released. Thereafter the setting ring 3 is set or adjusted so that when the contacts 8—10 are closed by the release of the shutter, i. e. rotation of knob 2, the closing occurs at the selected "flash time" or moment of firing the flash.

We claim:

A photoflash synchronizing mechanism for cameras of the focal plane shutter type comprising, in combination, a camera housing, an exposure timing knob rotatably mounted thereon, an exposure time scale on said knob for rotatably adjusting the knob to a selected time exposure value with reference to a fixed mark on the housing, an annular cam integral with said timing knob, said cam having a depression area adapted to be moved into a position corresponding to a selected time exposure value determined by the rotary adjustment of said timing knob, a photoflash lamp, an electric circuit therefor including two normally open circuit terminals, a flash value scale on the housing, a flash value setting ring rotatably mounted on said housing to rotate about and within said timing knob in rotatable adjustable relation to said flash value scale, means for supporting one of said terminals on said setting ring insulated therefrom, a circuit closing lever pivoted on said setting ring within the timing knob and engaging said cam to prevent closure of the circuit, said lever forming the other of said terminals, said lever having a nose adapted to enter said cam depression area upon rotation of the cam from its said adjusted time value position and a spring within said setting ring engaging said lever to cause the nose thereof to enter the said depression area to move said lever into circuit closing contact with said setting ring contact when said cam is rotated with said timing knob in a direction opposite to the direction of the time setting movement of the knob.

ADAM WAGNER.
AUGUST BRÖHL.
WALTER JUNG.

References Cited in the file of this patent
UNITED STATES PATENTS

| Number | Name | Date |
|---|---|---|
| 2,123,112 | Krueger | July 5, 1938 |
| 2,263,045 | Mendelsohn | Nov. 18, 1941 |
| 2,284,486 | Hineline | May 26, 1942 |
| 2,291,190 | Schwartz et al. | July 28, 1942 |
| 2,455,365 | Jenner | Dec. 7, 1948 |
| 2,552,250 | Bornemann et al. | May 8, 1951 |

FOREIGN PATENTS

| Number | Country | Date |
|---|---|---|
| 909,143 | France | Nov. 26, 1945 |